United States Patent
Hoye

(10) Patent No.: US 9,862,315 B2
(45) Date of Patent: Jan. 9, 2018

(54) DRIVER COACHING FROM VEHICLE TO VEHICLE AND VEHICLE TO INFRASTRUCTURE COMMUNICATIONS

(71) Applicant: Lytx, Inc., San Diego, CA (US)

(72) Inventor: Brett Hoye, San Marcos, CA (US)

(73) Assignee: Lytx, Inc., San Diego, CA (US)

( * ) Notice: Subject to any disclaimer, the term of this patent is extended or adjusted under 35 U.S.C. 154(b) by 0 days.

(21) Appl. No.: 15/234,984

(22) Filed: Aug. 11, 2016

(65) Prior Publication Data

US 2017/0066374 A1 Mar. 9, 2017

Related U.S. Application Data

(60) Provisional application No. 62/204,356, filed on Aug. 12, 2015.

(51) Int. Cl.
| | |
|---|---|
| *B60Q 1/00* | (2006.01) |
| *B60Q 9/00* | (2006.01) |
| *G08G 1/16* | (2006.01) |
| *B60W 50/14* | (2012.01) |
| *G08B 21/06* | (2006.01) |
| *G08B 21/02* | (2006.01) |

(52) U.S. Cl.
CPC ............... *B60Q 9/00* (2013.01); *B60W 50/14* (2013.01); *G08B 21/06* (2013.01); *G08G 1/161* (2013.01); *G08B 21/02* (2013.01)

(58) Field of Classification Search
CPC .................................................. B60W 50/14
USPC ........................................................ 340/439
See application file for complete search history.

(56) References Cited

U.S. PATENT DOCUMENTS

| | | | |
|---|---|---|---|
| 6,864,784 B1 * | 3/2005 | Loeb ................ | G08G 1/096716 180/171 |
| 8,554,468 B1 | 10/2013 | Bullock | |
| 2002/0128774 A1 | 9/2002 | Takezaki | |
| 2010/0007480 A1 * | 1/2010 | Uozumi ................... | A61B 5/18 340/436 |
| 2011/0077028 A1 * | 3/2011 | Wilkes, III ............ | B60W 50/14 455/456.3 |
| 2012/0025969 A1 | 2/2012 | Dozza | |
| 2012/0203399 A1 * | 8/2012 | Filev ..................... | B60W 30/02 701/1 |
| 2014/0210625 A1 * | 7/2014 | Nemat-Nasser ..... | B60K 28/066 340/575 |
| 2015/0170429 A1 * | 6/2015 | Denny .................. | B60W 30/09 701/36 |
| 2015/0286929 A1 * | 10/2015 | Weekes .............. | G06Q 30/0631 706/46 |

(Continued)

FOREIGN PATENT DOCUMENTS

CA 2382584 11/2003

*Primary Examiner* — Santiago Garcia
(74) *Attorney, Agent, or Firm* — Van Pelt, Yi & James LLP

(57) ABSTRACT

A system for determining driver errors includes an interface and a processor. The interface is configured to receive a safety warning from a safety warning system. The processor is configured to determine an appropriate driver response based at least in part on the safety warning; determine a driver response; determine whether the driver response comprises the appropriate driver response; and in the event the driver response does not comprise the appropriate driver response, indicating a driver error.

20 Claims, 12 Drawing Sheets

(56) References Cited

U.S. PATENT DOCUMENTS

| | | | |
|---|---|---|---|
| 2015/0314783 A1* | 11/2015 | Nespolo | B60W 30/0953 |
| | | | 701/301 |
| 2016/0207539 A1* | 7/2016 | Jung | G06F 3/013 |
| 2016/0248957 A1* | 8/2016 | Kim | H04N 5/2354 |
| 2016/0257305 A1* | 9/2016 | Riviere-Cazaux | B60W 50/14 |

* cited by examiner

DRIVER COACHING FROM VEHICLE TO VEHICLE AND VEHICLE TO INFRASTRUCTURE COMMUNICATIONS

This application claims priority to U.S. Provisional Patent Application No. 62/204,356 entitled DRIVER COACHING FROM VEHICLE TO VEHICLE AND VEHICLE TO INFRASTRUCTURE COMMUNICATIONS filed Aug. 12, 2015 which is incorporated herein by reference for all purposes.

BACKGROUND OF THE INVENTION

Modern vehicles (e.g., airplanes, boats, trains, cars, trucks, etc.) can include a vehicle event recorder in order to better understand the timeline of an anomalous event. A vehicle event recorder typically includes a set of sensors—for example, video recorders, audio recorders, accelerometers, gyroscopes, vehicle state sensors, GPS (global positioning system), etc.—that report data, which is used to determine the occurrence of an anomalous event. Anomalous events can include accidents, rough conditions (e.g., potholes), hazardous driving, etc. Sensor data indicating anomalous events can then be transmitted to an external storing and/or reviewing system. However, information captured local to the vehicle is not always sufficient to optimally determine anomalous events.

BRIEF DESCRIPTION OF THE DRAWINGS

Various embodiments of the invention are disclosed in the following detailed description and the accompanying drawings.

DETAILED DESCRIPTION

Figure 1:
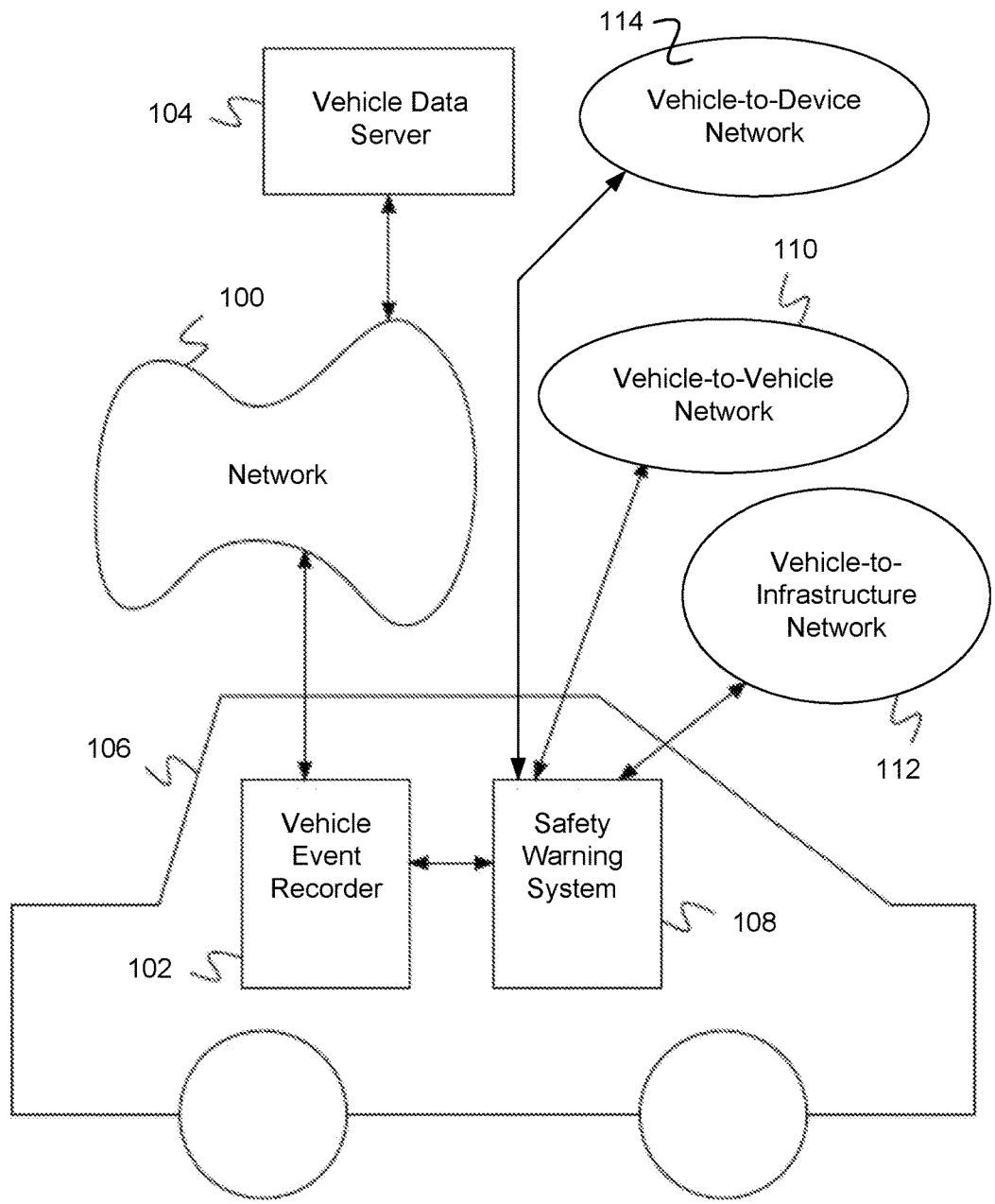
FIG. 1 is a block diagram illustrating an embodiment of a system including a vehicle event recorder.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for determining driver errors comprises a safety warning system interface for receiving a safety warning from a safety warning system, an appropriate driver response determiner for determining an appropriate driver response based at least in part on the safety warning, a driver response determiner for determining a driver response, and a driver response comparator for determining whether the driver response comprises the appropriate driver response, and in the event the driver response does not comprise the appropriate driver response, indicating a driver error.

In some embodiments, a system for determining driver errors comprises a system for interacting with a vehicle-to-vehicle, vehicle-to-infrastructure, and/or vehicle-to-device communications system. The system uses the information received via these communication systems (e.g., the vehicle-to-vehicle, vehicle-to-infrastructure and/or vehicle to device communications systems) to adjust and/or enhance the determination of anomalous events (e.g., adjusting trigger levels—for example, lowering threshold levels associated with specific sensors, recording from a different set of sensors—for example, a backup camera when moving forward due to a warning of an oncoming emergency vehicle from behind, etc.). The anomalous events trigger the storage of, transmission of, or flagging for transmission of sensor data related to the anomalous event. In some embodiments, the system directly provides feedback to a driver based on the anomalous event detected. The system for determining driver errors receives safety warnings from the vehicle-to-vehicle (V2V), vehicle-to-infrastructure (V2I), and/or vehicle-to-device (V2D) communications system. In various embodiments, safety warnings comprise intersection collision warning, stop sign movement assistance, traffic signal violation warning, stop sign violation warning, left turn assist, blind merge warning, pedestrian crossing information, work zone warning, road hazard safety messages, post-accident safety warnings, approaching emergency vehicle warnings, emergency vehicle signal preemption, cooperative forward collision warning, emergency electronic brake lights, lane change warning, blind spot warning, erratic vehicle safety warnings, road closure safety warnings, school zone warning, curve speed warning, wrong way driver warning, highway merge assist, or any other appropriate safety warnings. The system for determining driver errors comprises an appropriate driver response determiner for determining an appropriate driver response based at least in part on the safety warnings. In some embodiments, the appropriate driver response determiner comprises a lookup table for looking up the safety warning and determining the appropriate driver response. For example, pulling to the side of the road, slowing down, hard braking, not changing lanes, etc. The system for determining driver errors comprises a driver response determiner for determining a driver response. In some embodiments, the driver response determiner receives data from a vehicle event recorder (e.g., machine vision lane tracking, global positioning system (GPS) data, vehicle data (e.g. speed, brake, steering angle, and turn signal), sensor data, video data, etc.). The driver response determiner processes data to determine the driver response. In some embodiments, the driver response determiner determines a driver response associated with a confidence value. The system for determining driver errors compares the driver response with the appropriate driver response using a driver response comparator. In the event the driver response does not comprise the appropriate driver response, a driver error is indicated. In some embodiments, an indication of a driver error comprises an indication to the driver (e.g., light and/or sound indication), an indication to a vehicle event server, recording data (e.g., sensor data, video data, vehicle to vehicle or vehicle to infrastructure communications system data, etc.). In some embodiments, the driver can then be coached at a later time to perform the appropriate driver response.

FIG. 1 is a block diagram illustrating an embodiment of a system including a vehicle event recorder. In the example shown, vehicle event recorder 102 comprises a vehicle event recorder mounted in a vehicle (e.g., a car or truck). In some embodiments, vehicle event recorder 102 includes or is in communication with a set of sensors—for example, camera(s), video recorder(s), audio recorder(s), accelerometer(s), gyroscope(s), vehicle state sensor(s), GPS, outdoor temperature sensor(s), moisture sensor(s), laser line tracker sensor(s), or any other appropriate sensors. In various embodiments, vehicle state sensors comprise a speedometer, an accelerator pedal sensor, a brake pedal sensor, an engine revolutions per minute (RPM) sensor, an engine temperature sensor, a headlight sensor, an airbag deployment sensor, driver and passenger seat weight sensors, an anti-locking brake sensor, an engine exhaust sensor, a gear position sensor, a cabin equipment operation sensor, a driver identification camera, a door open sensor, an ignition on sensor, a power take-off sensor, a cargo door sensor, a rear activity camera, active safety system sensors, machine vision sensors, or any other appropriate vehicle state sensors. In some embodiments, vehicle event recorder 102 comprises a system for processing sensor data and detecting events. In some embodiments, vehicle event recorder 102 comprises a system for capturing interior video capturing driver behavior, awareness and capabilities. In various embodiments, vehicle event recorder 102 comprises a system for detecting and uploading anomalous driving events, for warning or coaching a driver, or for any other appropriate purpose. In various embodiments, vehicle event recorder 102 is mounted to vehicle 106 in one or more of the following locations: the chassis, the front grill, the dashboard, the rear-view mirror, or any other appropriate location. In some embodiments, vehicle event recorder 102 comprises multiple units mounted in different locations in vehicle 106. In some embodiments, vehicle event recorder 102 comprises a communications system for communicating with network 100. In various embodiments, network 100 comprises a wireless network, a wired network, a cellular network, a CDMA network, a GSM network, a local area network, a wide area network, the Internet, or any other appropriate network. Vehicle event recorder 102 communicates with vehicle data server 104 via network 100. Vehicle event recorder 102 is mounted on vehicle 106. In various embodiments, vehicle 106 comprises a car, a truck, a commercial vehicle, or any other appropriate vehicle. Vehicle data server 104 comprises a vehicle data server for collecting events and risky behavior detected by vehicle event recorder 102. In some embodiments, vehicle data server 104 comprises a system for collecting data from multiple vehicle event recorders. In some embodiments, vehicle data server 104 comprises a system for analyzing vehicle event recorder data. In some embodiments, vehicle data server 104 comprises a system for displaying vehicle event recorder data. In some embodiments, vehicle data server 104 is located at a home station (e.g., a shipping company office, a taxi dispatcher, a truck depot, etc.). In some embodiments, events recorded by vehicle event recorder 102 are downloaded to vehicle data server 104 in the event that vehicle 106 arrives at the home station. In some embodiments, vehicle data server 104 is located at a remote location.

In the example shown, vehicle 106 comprises safety warning system 108 in communication with vehicle event recorder 102. In some embodiments, safety warning system 108 comprises a safety warning system for providing safety warnings to a driver. In some embodiments, safety warning system 108 comprises a safety warning system for providing safety warnings to vehicle event recorder 102. In some embodiments, safety warning system 108 receives safety warnings from vehicle to vehicle network 110. In some embodiments, vehicle-to-vehicle network 110 comprises a network for direct vehicle-to-vehicle communications. In various embodiments, vehicle-to-vehicle network 110 comprises a network for communicating safety messages that include vehicle speed information, vehicle position information, vehicle turn signal information, vehicle braking, emergency vehicle warning, traffic information, road hazard information, or any other appropriate information. In some embodiments, safety warning system 108 receives safety messages from vehicle to vehicle network 110 and generates warnings to the driver (e.g. forward collision warning, blind merge warning, intersection collision warning). In some embodiments, vehicle-to-infrastructure network 112 comprises a network for communications between a vehicle and an infrastructure element (e.g., a, street light, a traffic light, a permanently-located communications hub, etc.). In various embodiments, vehicle-to-infrastructure network 112 comprises a network for communicating safety warnings such as a stop sign, road construction warning, sign extension, school zone warning, traffic information, road hazard information, traffic light information, curve speed warning, work zone warning, low bridge warning or any other appropriate information. In some embodiments, vehicle to device network 114 comprises a network for communication between a vehicle and a device (e.g., a cell phone). In various embodiments, vehicle-to-device network 114 comprises a network for communicating safety information such as pedestrian location and speed. In some embodiments, safety warning system 108 receives safety messages from vehicle to device network 114 and generates warnings to the driver (e.g., pedestrian crossing warning, blind merge warning, etc.).

Figure 2:
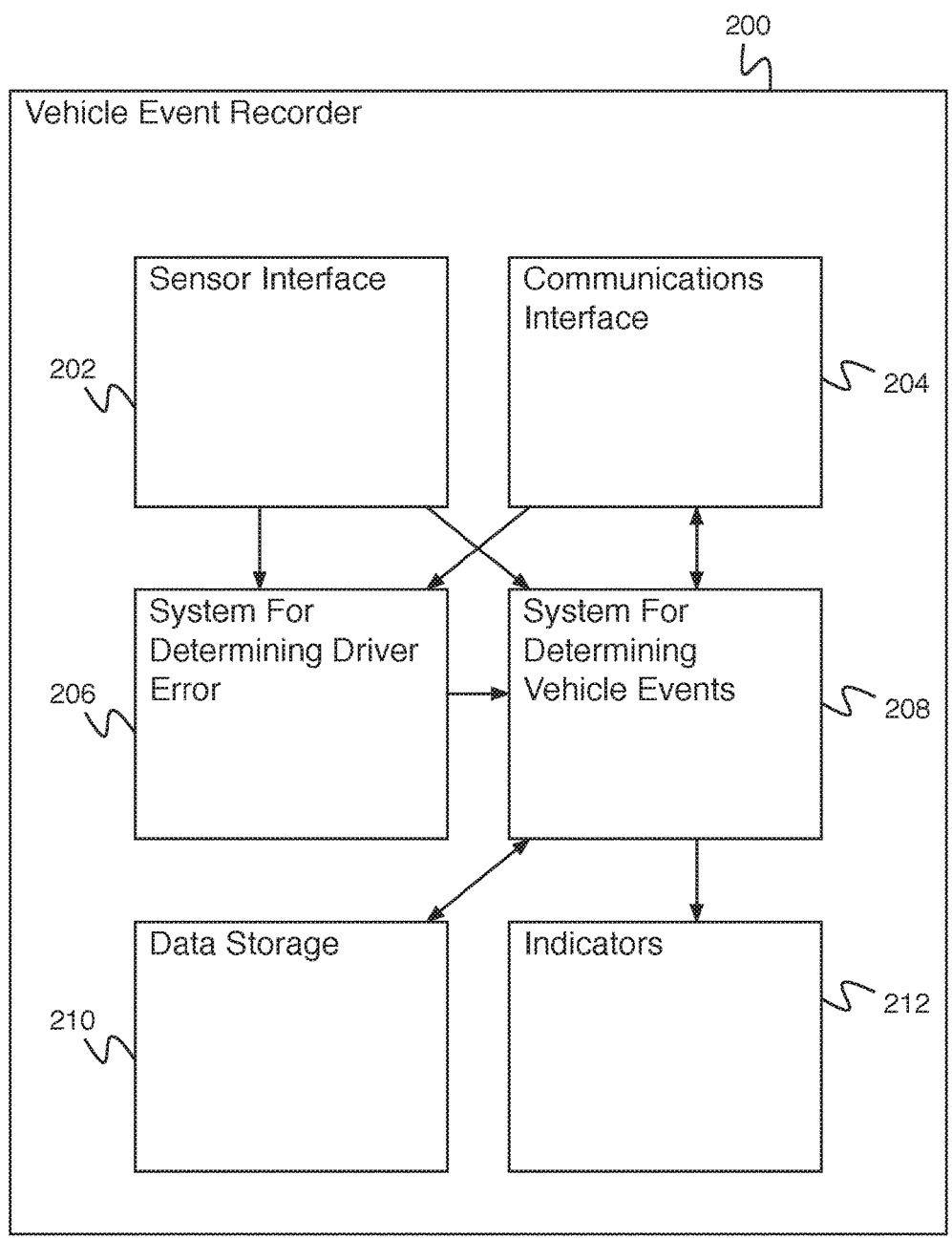
FIG. 2 is a block diagram illustrating an embodiment of a vehicle event recorder.

FIG. 2 is a block diagram illustrating an embodiment of a vehicle event recorder. In some embodiments, vehicle event recorder 200 comprises vehicle event recorder 102 of FIG. 1. In the example shown, vehicle event recorder 200 comprises sensor interface 202. Sensor interface 202 comprises a sensor interface for communicating with sensors. In various embodiments, sensors comprise a road-facing video recorder, a driver-facing video recorder, an audio recorder, an accelerometer, a nearby vehicle distance sensor, a forward vehicle proximity sensor, a global positioning system (e.g., GPS) sensor, a vehicle engine sensor, a passenger seat sensor, a driver seat sensor, a seat belt sensor, a line tracker sensor, a vehicle headlight sensor, a vehicle speed sensor, a vehicle turn signal sensor, a vehicle gas pedal sensor, a vehicle brake pedal sensor, or any other appropriate sensor accessed directly or through the vehicle communication bus infrastructure. Vehicle event recorder 200 additionally comprises communications interface 204. In various embodiments, communications interface 204 comprises a communications interface for communicating with a network (e.g., network 100 of FIG. 1), with a vehicle communications interface, with a vehicle-to-vehicle network, with a vehicle-to-infrastructure network, with a local wireless network (e.g., a Bluetooth™ network), with a wired network, or with any other appropriate network. Vehicle event recorder 200 additionally comprises system for determining driver error 206. In some embodiments, system for determining driver error 206 comprises a system for communicating with a safety warning system (e.g., safety warning system 108 of FIG. 1). In some embodiments, system for determining driver error 206 comprises a system for determining an appropriate driver response to a safety warning. In some embodiments, system for determining driver error 206 comprises a system for determining whether a driver responded appropriately to a safety warning. In some embodiments, system for determining driver error comprises a safety warning system (e.g., a system for receiving communications via a vehicle-to-vehicle network or vehicle-to-infrastructure network and determining safety warnings). Vehicle event recorder 200 comprises system for determining vehicle events 208. In some embodiments, system for determining vehicle events 208 comprises a system for receiving data (e.g., sensor data, communications data, data from system for determining driver error 206, etc.) and determining vehicle events (e.g., anomalous vehicle events). In various embodiments, system for determining vehicle events communicates vehicle events via communications interface 204, stores vehicle events in data storage 210, provides an indication of vehicle events via indicators 212, or responds in any other appropriate way to the detection of a vehicle event.

In various embodiments, vehicle event recorder 200 includes one or more processors for performing the functions associated with sensor interface 202, communications interface 204, system for determining driver error 206, system for determining vehicle events 208, data storage 210, and/or indicators 212. The one or more processors of vehicle event recorder 200 are coupled to one or more memories that are configured to provide the one or more processors instructions and/or to provide data to and/or to store data for the one or more processors.

Figure 3:
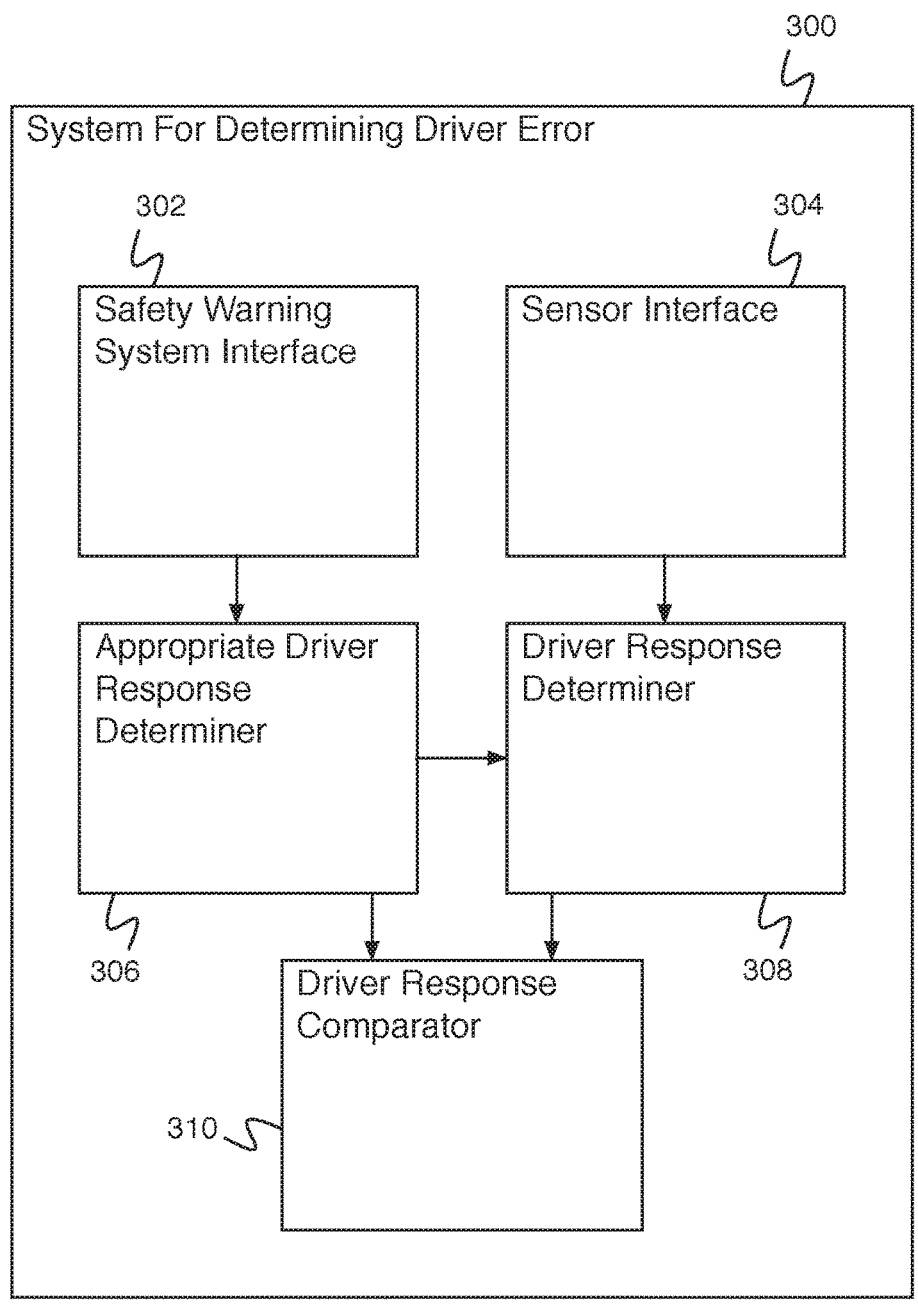
FIG. 3 is a block diagram illustrating an embodiment of a system for determining driver error.

FIG. 3 is a block diagram illustrating an embodiment of a system for determining driver error. In some embodiments, system for determining driver error 300 comprises system for determining driver error 206 of FIG. 2. In the example shown, system for determining driver error 300 comprises a system for determining whether a driver fails to respond appropriately to a safety warning. In some embodiments, a safety warning comprises a warning determined by a safety warning system. In some embodiments, a safety warning comprises a warning determined in response to a communication via a vehicle-to-vehicle network, a vehicle-to-infrastructure network, or a vehicle-to-device network. In various embodiments, a safety warning comprises an emergency vehicle approaching safety warning, an accident ahead safety warning, a traffic light disabled safety warning, a following too close safety warning, a heavy traffic ahead safety warning, a road hazard ahead safety warning, a pedestrian warning, a low bridge warning, a curve speed warning, a road construction warning, an intersection collision avoidance warning, a stop sign violation warning, a post-crash warning, or any other appropriate safety warning. System for determining driver error 300 comprises safety warning system interface 302 for receiving safety warnings from a safety warning system. In some embodiments, system for determining driver error 300 comprises a safety warning system for determining a safety warning in response to a communication via a vehicle-to-vehicle network, a vehicle-to-infrastructure network, or a vehicle-to-device network (e.g., and providing the safety warning via safety warning system interface 302). In some embodiments, safety warning system interface 302 is implemented using a processor. System for determining driver error 302 comprises appropriate driver response determiner 306. In some embodiments, appropriate driver response determiner 306 comprises an appropriate driver response determiner for determining an appropriate driver response to a safety warning. In various embodiments, an appropriate driver response comprises slowing down, pulling over, looking around, turning on vehicle headlights, increasing following distance, or any other appropriate driver response. In some embodiments, a safety warning comprises one of a set of possible safety warnings, and appropriate driver response determiner 306 comprises a table for looking up the appropriate driver response. In some embodiments, appropriate driver response determiner 306 process safety warning data to determine an appropriate driver response (e.g., how fast a driver needs to stop, etc.). In some embodiments, appropriate driver response determiner 306 additionally determines indications of an appropriate driver response. Appropriate driver response determiner 306 provides the appropriate driver response to driver response comparator 310. In some embodiments, appropriate driver response determiner 306 provides the appropriate driver response to driver response determiner 308. In some embodiments, appropriate driver response determiner 306 additionally provides one or more indications of the appropriate driver response to driver response determiner 308. In some embodiments, appropriate driver response determiner 306 is implemented using a processor. System for determining driver error 300 comprises sensor interface 304 for receiving sensor data (e.g., from sensor interface 202 of FIG. 2). In some embodiments, sensor interface 304 is implemented using a processor. Driver response determiner 308 receives sensor data from sensor interface 304 and determines a driver response. In various embodiments, a driver response is based at least in part on sensor data, on vehicle event recorder data, on an appropriate driver response, or on any other appropriate information. In some embodiments, driver response determiner 308 receives an appropriate driver response from appropriate driver response determiner 306. In some embodiments, driver response determiner 308 utilizes an appropriate driver response from appropriate driver response determiner 306 to improve the efficiency of driver response determination (e.g., to determine when to determine a driver response, to determine what sensor data to analyze, etc.). In some embodiments, driver response determiner 308 is implemented using a processor. Driver response comparator 310 comprises a driver response comparator for comparing an appropriate driver response and a driver response. In some embodiments, in the event that the driver response comparator determines that the driver response does not comprise the appropriate driver response, driver response comparator 310 provides an indication of a driver error. In some embodiments, driver error is indicated to a system for determining vehicle events (e.g., system for determining vehicle events 208 of FIG. 2). In various embodiments, indicating a driver error comprises providing coaching information (e.g., a system for determining vehicle events providing coaching information), recording sensor data (e.g., stored within a data storage), recording video data, recording safety warning system data, providing an indication to the driver (e.g., a light indication or a sound indication—for example, via indicators as in indicators 212 of FIG. 2), or indicating a driver error in any other appropriate way. In some embodiments, driver response comparator 310 is implemented using a processor. In various embodiments, the elements of system for determining driver error 300 are implemented each using individual processors, all using a single processor, or combined using multiple processors in any appropriate way.

Figure 4:
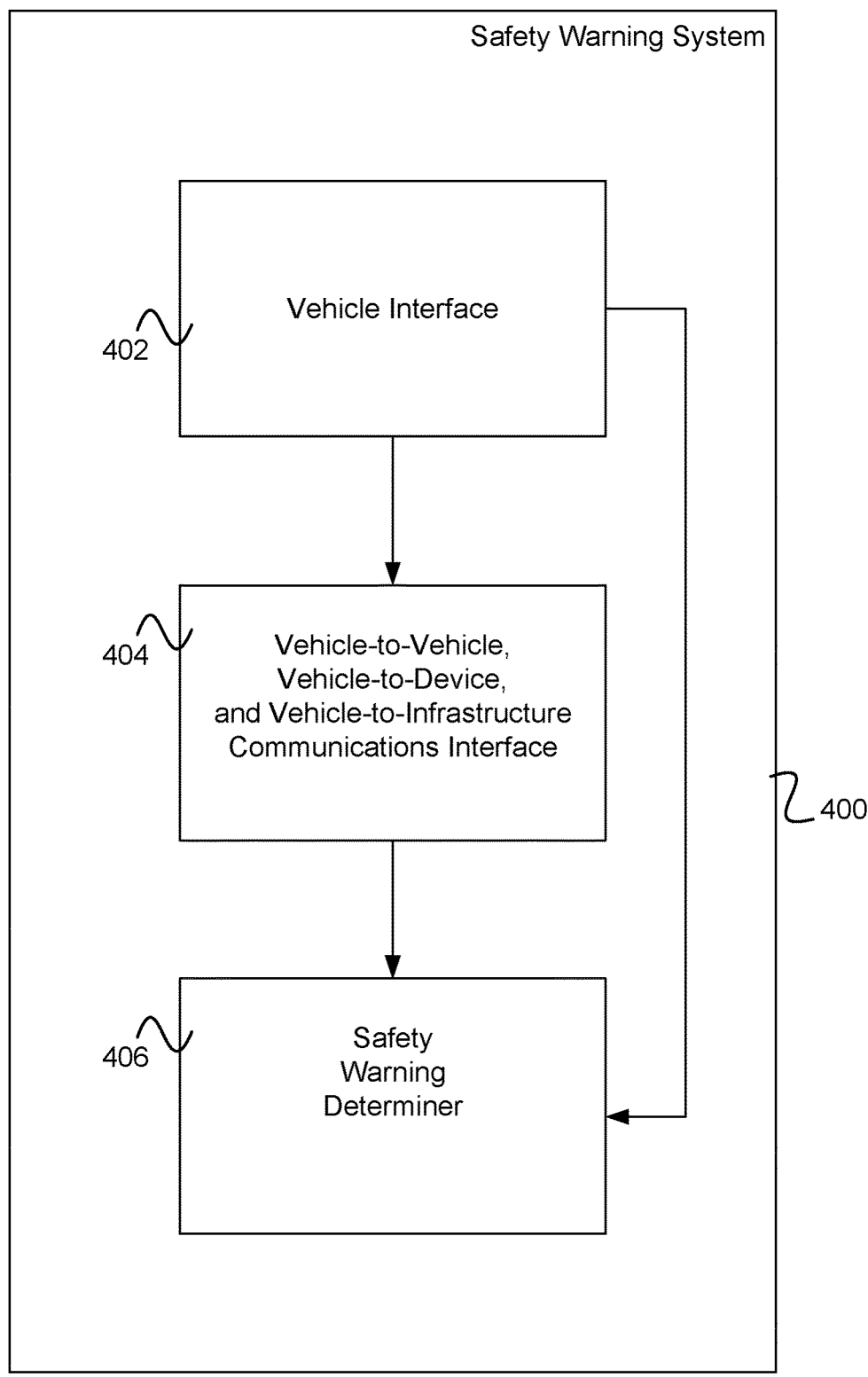
FIG. 4 is a block diagram illustrating an embodiment of a safety warning system.

FIG. 4 is a block diagram illustrating an embodiment of a safety warning system. In some embodiments, safety warning system 400 comprises safety warning system 108 of FIG. 1. In some embodiments, safety warning system comprises a safety warning system comprised by a vehicle event recorder. In the example shown, safety warning system 400 comprises vehicle interface 402. In some embodiments, vehicle interface 402 comprises a vehicle interface for determining vehicle information to be communicated via a vehicle-to-vehicle or vehicle-to-infrastructure network. In some embodiments, vehicle interface 402 comprises a sensor interface. Vehicle-to-vehicle, vehicle-to-device, and vehicle-to-infrastructure communications interface 404 comprises a communications interface for sending and receiving information via a vehicle-to-vehicle, a vehicle-to-device, or a vehicle-to-infrastructure network. In some embodiments, vehicle-to-vehicle, vehicle-to-device, and vehicle-to-infrastructure communications interface 404 comprises an interface for receiving safety messages. Safety warning determiner 406 comprises a safety warning determiner for receiving information from vehicle-to-vehicle, vehicle-to-device, and vehicle-to-infrastructure communications interface 404 and vehicle information from vehicle interface 402 and determining a safety warning. In some embodiments, safety warning determiner 406 provides a safety warning to a system for determining driver error (e.g., system for determining driver errors 300 of FIG. 3).

Figure 5:
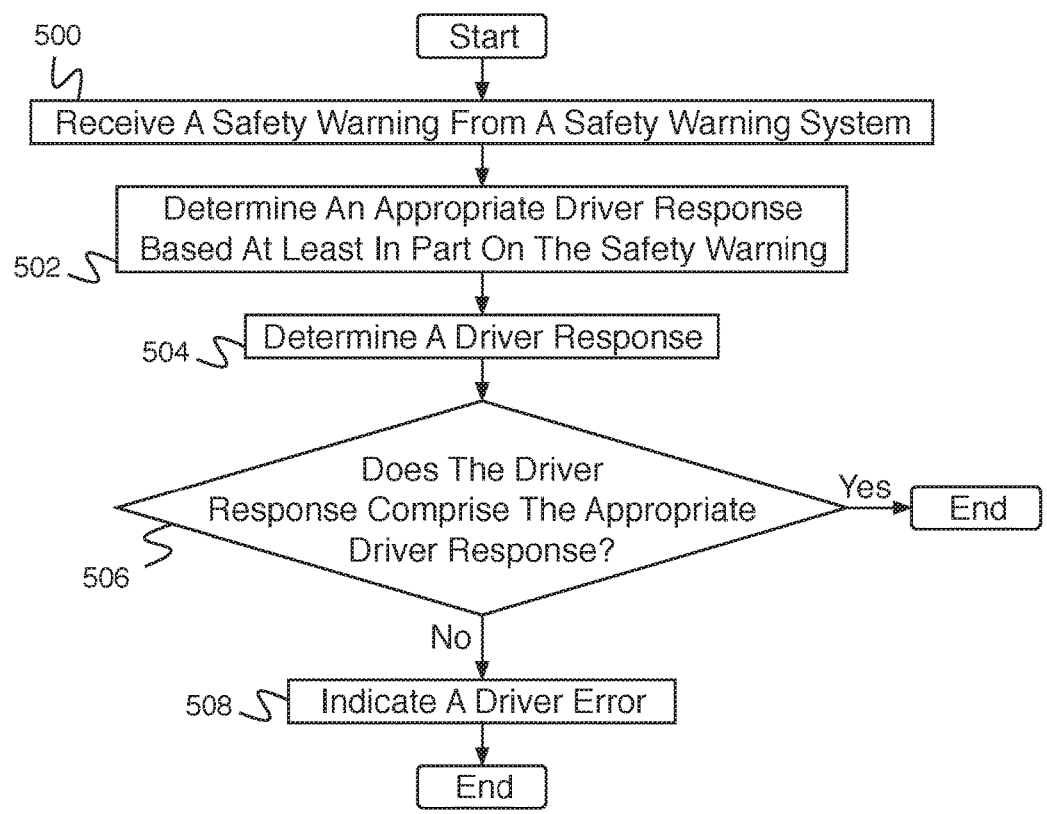
FIG. 5 is a flow diagram illustrating an embodiment of a process for determining driver errors.

FIG. 5 is a flow diagram illustrating an embodiment of a process for determining driver errors. In some embodiments, the process of FIG. 5 is performed by a system for determining driver errors (e.g., system for determining driver errors 300 of FIG. 3). In the example shown, in 500, a safety warning is received from a safety warning system. In 502, an appropriate driver response is determined based at least in part on the safety warning. In 504, a driver response is determined. In 506, it is determined whether the driver response comprises the appropriate driver response. In the event the driver response comprises the appropriate driver response, the process ends. In the event the driver response does not comprise the appropriate driver response, control passes to 508. In 508, a driver error is indicated, and the process ends. In various embodiments, the driver error is indicated using a display, a warning light, a blinking pattern of a warning light, a sound alert, a text displayed to the driver, or any other appropriate indication. In various embodiments, the system causes, on indicating a driver error, causes storage of event data (e.g., storage of video data, audio data, accelerometer data, sensor data, vehicle data, etc.), transmitting of the event data to a server, changing of one or more thresholds to trigger events, type of storage (e.g., detailed event storage, abbreviated event storage, etc.), or any other appropriate action.

Figure 6:
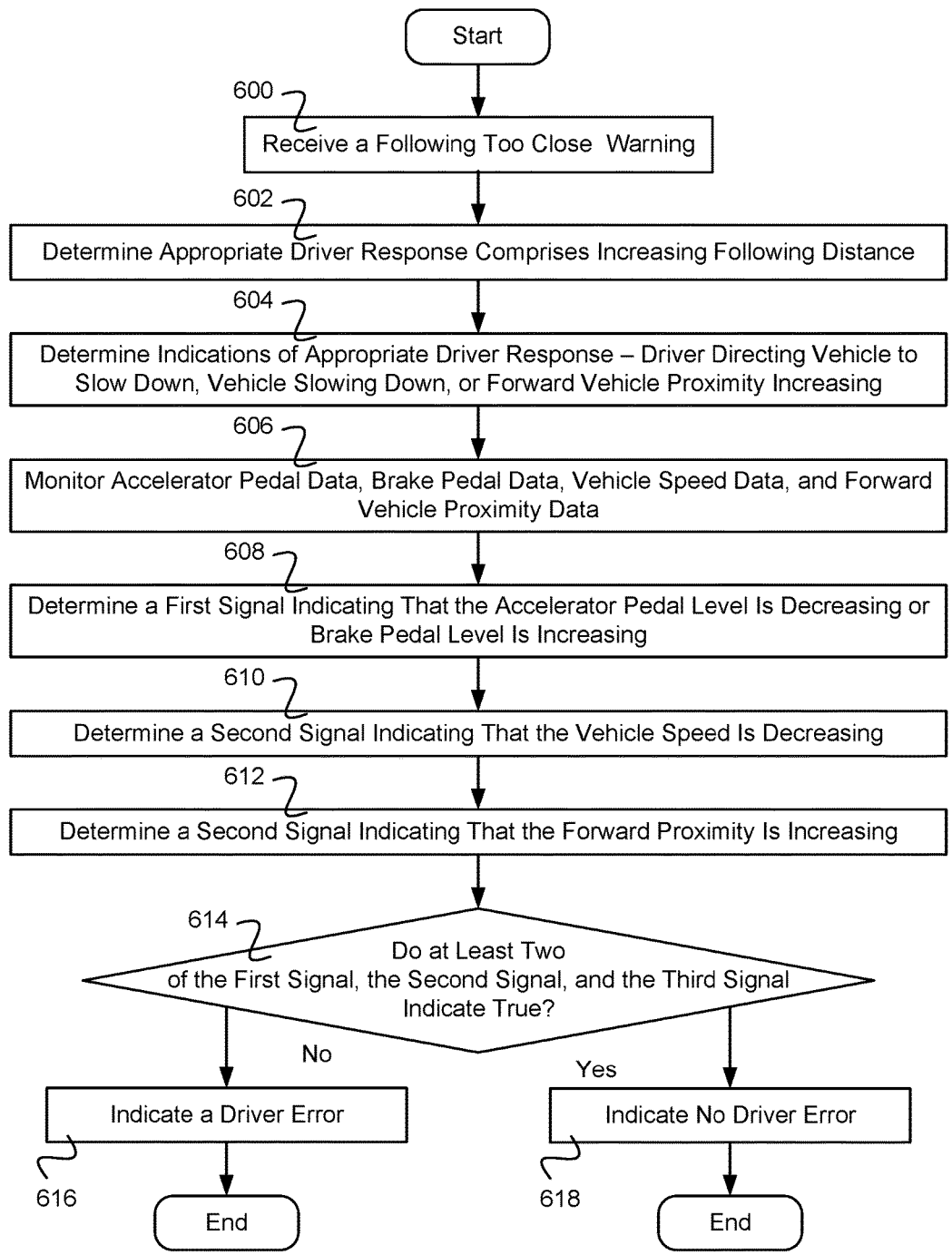
FIG. 6 is a flow diagram illustrating an embodiment of a process for determining a driver error in response to a following too close warning from a safety warning system.

FIG. 6 is a flow diagram illustrating an embodiment of a process for determining a driver error in response to a following too close warning. In some embodiments, the process of FIG. 6 is performed by a system for determining driver errors (e.g., system for determining driver errors 300 of FIG. 3). In the example shown, in 600, a following-too-close warning is received. For example, the system receives a following too close warning from a safety warning system via a network. In 602, it is determined that an appropriate driver response to comprises increasing following distance. In 604, it is determined that indications of an appropriate driver response comprise the driver directing the vehicle to slow down, the vehicle slowing down, or forward vehicle proximity increasing. In 606, accelerator pedal data, brake pedal data, vehicle speed data, and forward vehicle proximity data are monitored. In 608, a first signal indicating that the accelerator pedal level is decreasing or that the brake pedal level is increasing is determined (e.g., the first signal indicates true in the event that the accelerator pedal level is decreasing or the brake pedal level is increasing). In 610, a second signal indicating that the vehicle speed is decreasing is determined. In 612, a third signal indicating that the forward vehicle proximity is increasing is determined. In some embodiments, determining the first signal, the second signal, and the third signal comprises determining a driver response. In 614, it is determined whether at least two of the first signal, the second signal, and the third signal indicate true. In some embodiments, determining whether at least two of the first signal, the second signal, and the third signal indicate true comprises determining whether the driver response comprises the appropriate driver response. In the event it is determined that not at least two of the first signal, the second signal, and the third signal indicate true, control passes to 616. In 616, a driver error is indicated, and the process ends. In the event it is determined in 614 that at least two of the first signal, the second signal, and the third signal indicate true, control passes to 618. In 618, it is determined that there is no driver error, and the process ends.

Figure 7:
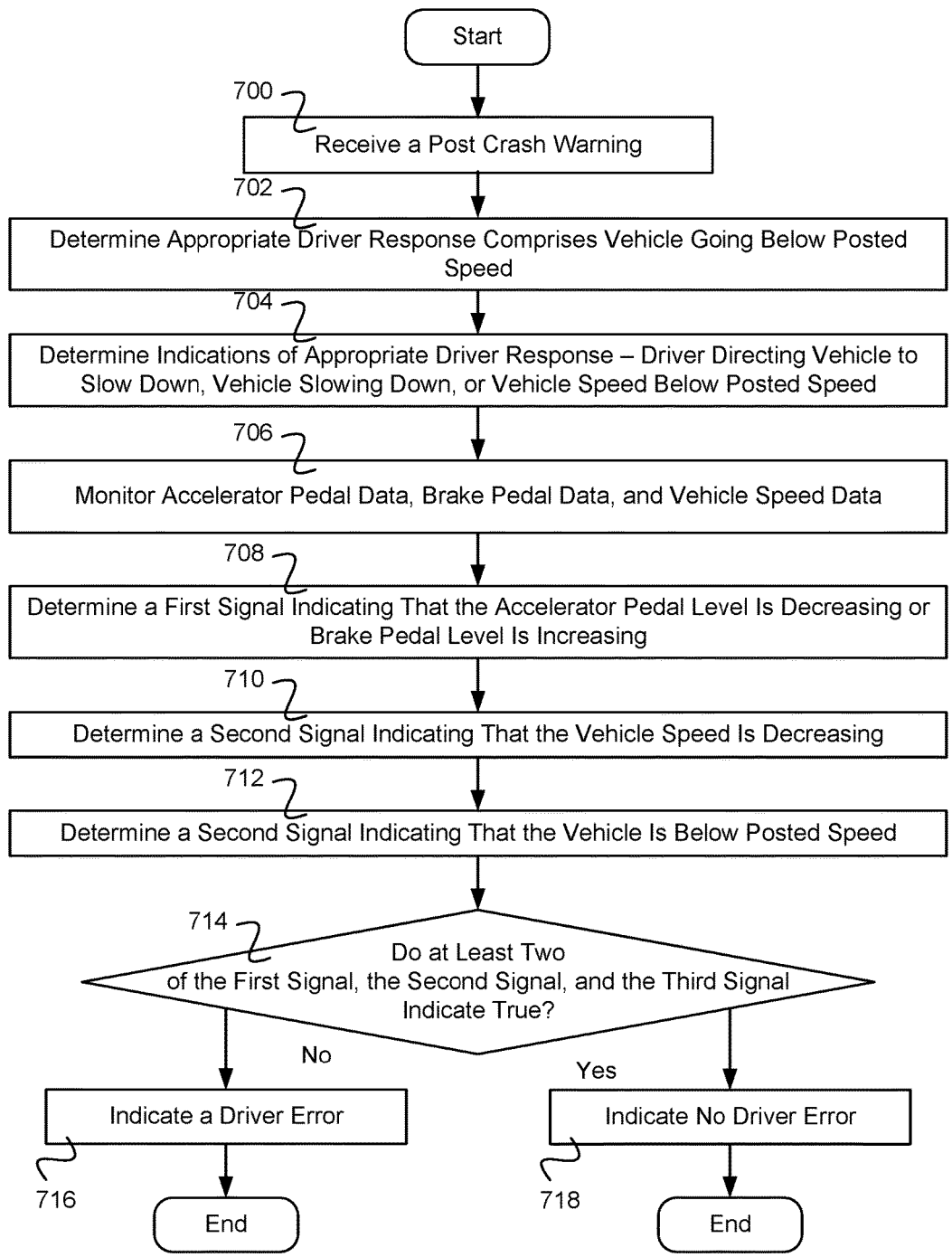
FIG. 7 is a flow diagram illustrating an embodiment of a process for determining a driver error in response to a post crash warning.

FIG. 7 is a flow diagram illustrating an embodiment of a process for determining a driver error in response to a post crash warning. In some embodiments, the process of FIG. 7 is performed by a system for determining driver errors (e.g., system for determining driver errors 300 of FIG. 3). In the example shown, in 700, a post crash warning is received. For example, the system receives a post crash warning from a safety warning system via a network. In 702, it is determined that an appropriate driver response to comprises the vehicle going below posted speed. In 704, it is determined that indications of an appropriate driver response comprise the driver directing the vehicle to slow down, the vehicle slowing down, or vehicle speed below posted speed. In 706, accelerator pedal data, brake pedal data, and vehicle speed data are monitored. In 708, a first signal indicating that the accelerator pedal level is decreasing or that the brake pedal level is increasing is determined (e.g., the first signal indicates true in the event that the accelerator pedal level is decreasing or the brake pedal level is increasing). In 710, a second signal indicating that the vehicle speed is decreasing is determined. In 712, a third signal indicating that the vehicle is going below posted speed is determined. In some embodiments, determining the first signal, the second signal, and the third signal comprises determining a driver response. In 714, it is determined whether at least two of the first signal, the second signal, and the third signal indicate true. In some embodiments, determining whether at least two of the first signal, the second signal, and the third signal indicate true comprises determining whether the driver response comprises the appropriate driver response. In the event it is determined that not at least two of the first signal, the second signal, and the third signal indicate true, control passes to 716. In 716, a driver error is indicated, and the process ends. In the event it is determined in 714 that at least two of the first signal, the second signal, and the third signal indicate true, control passes to 718. In 718, it is determined that there is no driver error, and the process ends.

Figure 8:
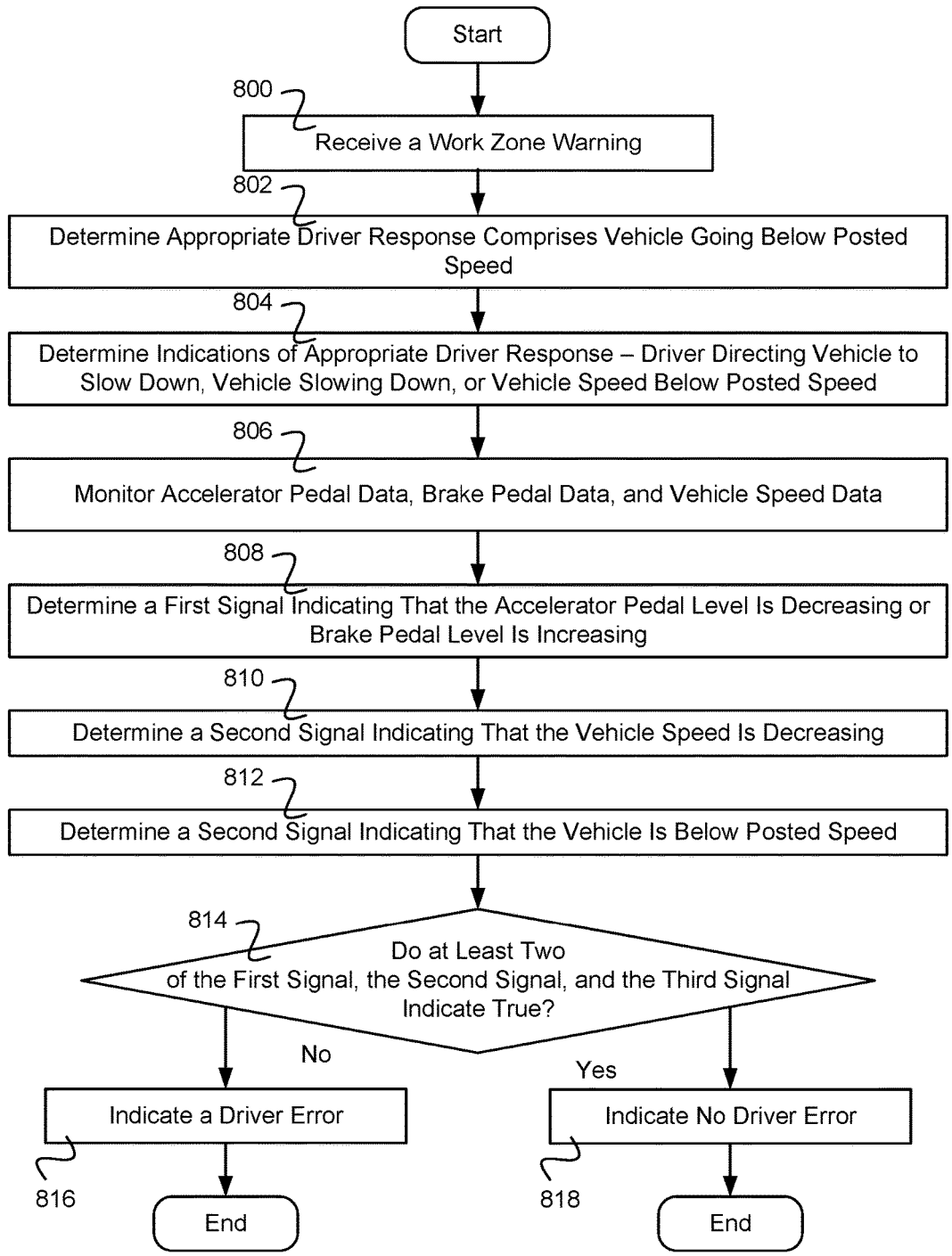
FIG. 8 is a flow diagram illustrating an embodiment of a process for determining a driver error in response to a work zone warning.

FIG. 8 is a flow diagram illustrating an embodiment of a process for determining a driver error in response to a work zone warning. In some embodiments, the process of FIG. 8 is performed by a system for determining driver errors (e.g., system for determining driver errors 300 of FIG. 3). In the example shown, in 800, a work zone warning is received. For example, the system receives a work zone warning from a safety warning system via a network. In 802, it is determined that an appropriate driver response to comprises the vehicle going below posted speed. In 804, it is determined that indications of an appropriate driver response comprise the driver directing the vehicle to slow down, the vehicle slowing down, or vehicle speed below posted speed. In 806, accelerator pedal data, brake pedal data, and vehicle speed data are monitored. In 808, a first signal indicating that the accelerator pedal level is decreasing or that the brake pedal level is increasing is determined (e.g., the first signal indicates true in the event that the accelerator pedal level is decreasing or the brake pedal level is increasing). In 810, a second signal indicating that the vehicle speed is decreasing is determined. In 812, a third signal indicating that the vehicle is going below posted speed is determined. In some embodiments, determining the first signal, the second signal, and the third signal comprises determining a driver response. In 814, it is determined whether at least two of the first signal, the second signal, and the third signal indicate true. In some embodiments, determining whether at least two of the first signal, the second signal, and the third signal indicate true comprises determining whether the driver response comprises the appropriate driver response. In the event it is determined that not at least two of the first signal, the second signal, and the third signal indicate true, control passes to 816. In 816, a driver error is indicated, and the process ends. In the event it is determined in 814 that at least two of the first signal, the second signal, and the third signal indicate true, control passes to 818. In 818, it is determined that there is no driver error, and the process ends.

Figure 9:
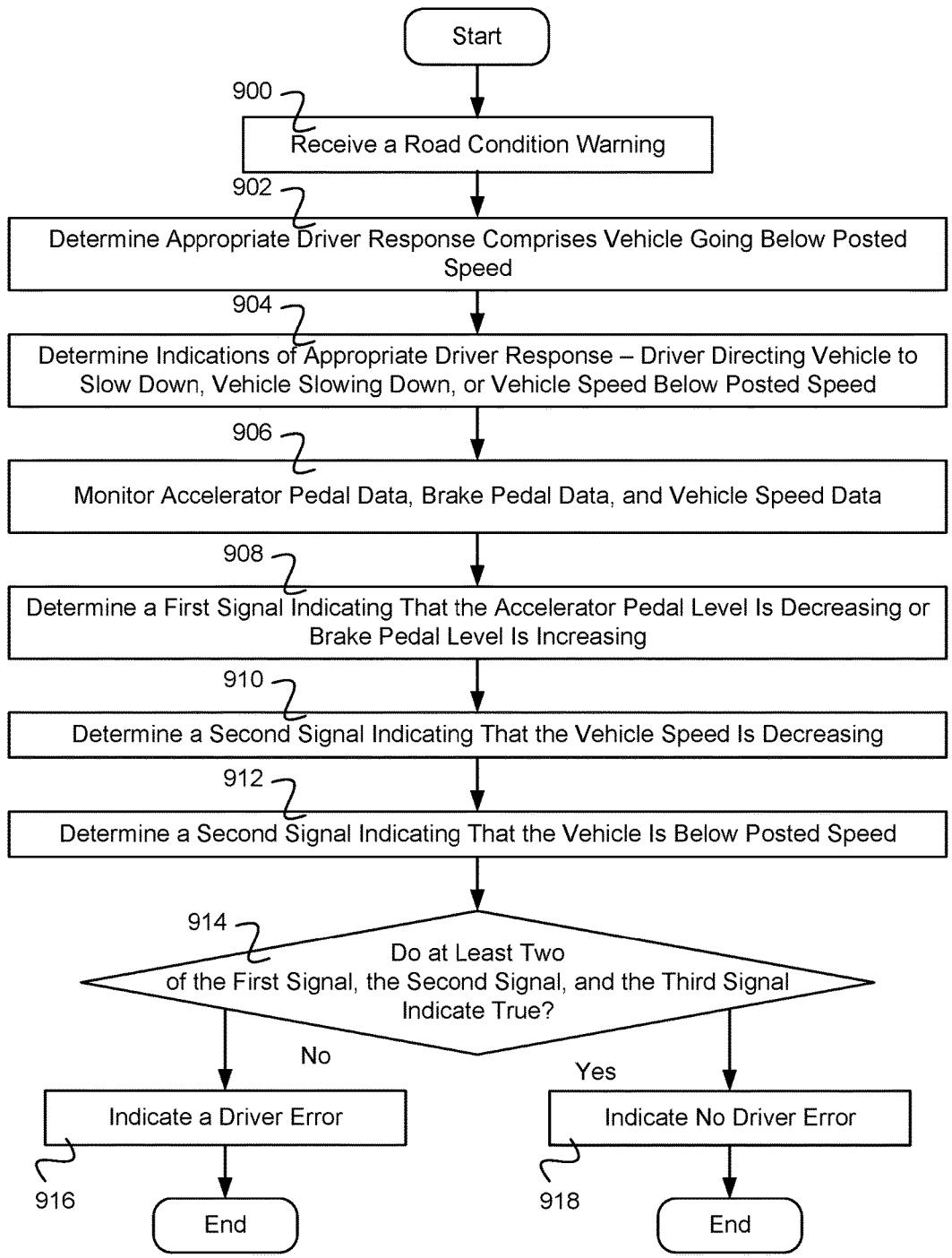
FIG. 9 is a flow diagram illustrating an embodiment of a process for determining a driver error in response to a road condition warning.

FIG. 9 is a flow diagram illustrating an embodiment of a process for determining a driver error in response to a road condition warning. In some embodiments, the process of FIG. 9 is performed by a system for determining driver errors (e.g., system for determining driver errors 300 of FIG. 3). In the example shown, in 900, a road condition warning is received. For example, the system receives a road condition warning from a safety warning system via a network. In 902, it is determined that an appropriate driver response to comprises the vehicle going below posted speed. In 904, it is determined that indications of an appropriate driver response comprise the driver directing the vehicle to slow down, the vehicle slowing down, or vehicle speed below posted speed. In 906, accelerator pedal data, brake pedal data, and vehicle speed data are monitored. In 908, a first signal indicating that the accelerator pedal level is decreasing or that the brake pedal level is increasing is determined (e.g., the first signal indicates true in the event that the accelerator pedal level is decreasing or the brake pedal level is increasing). In 910, a second signal indicating that the vehicle speed is decreasing is determined. In 912, a third signal indicating that the vehicle is going below posted speed is determined. In some embodiments, determining the first signal, the second signal, and the third signal comprises determining a driver response. In 914, it is determined whether at least two of the first signal, the second signal, and the third signal indicate true. In some embodiments, determining whether at least two of the first signal, the second signal, and the third signal indicate true comprises determining whether the driver response comprises the appropriate driver response. In the event it is determined that not at least two of the first signal, the second signal, and the third signal indicate true, control passes to 916. In 916, a driver error is indicated, and the process ends. In the event it is determined in 914 that at least two of the first signal, the second signal, and the third signal indicate true, control passes to 918. In 918, it is determined that there is no driver error, and the process ends.

Figure 10:
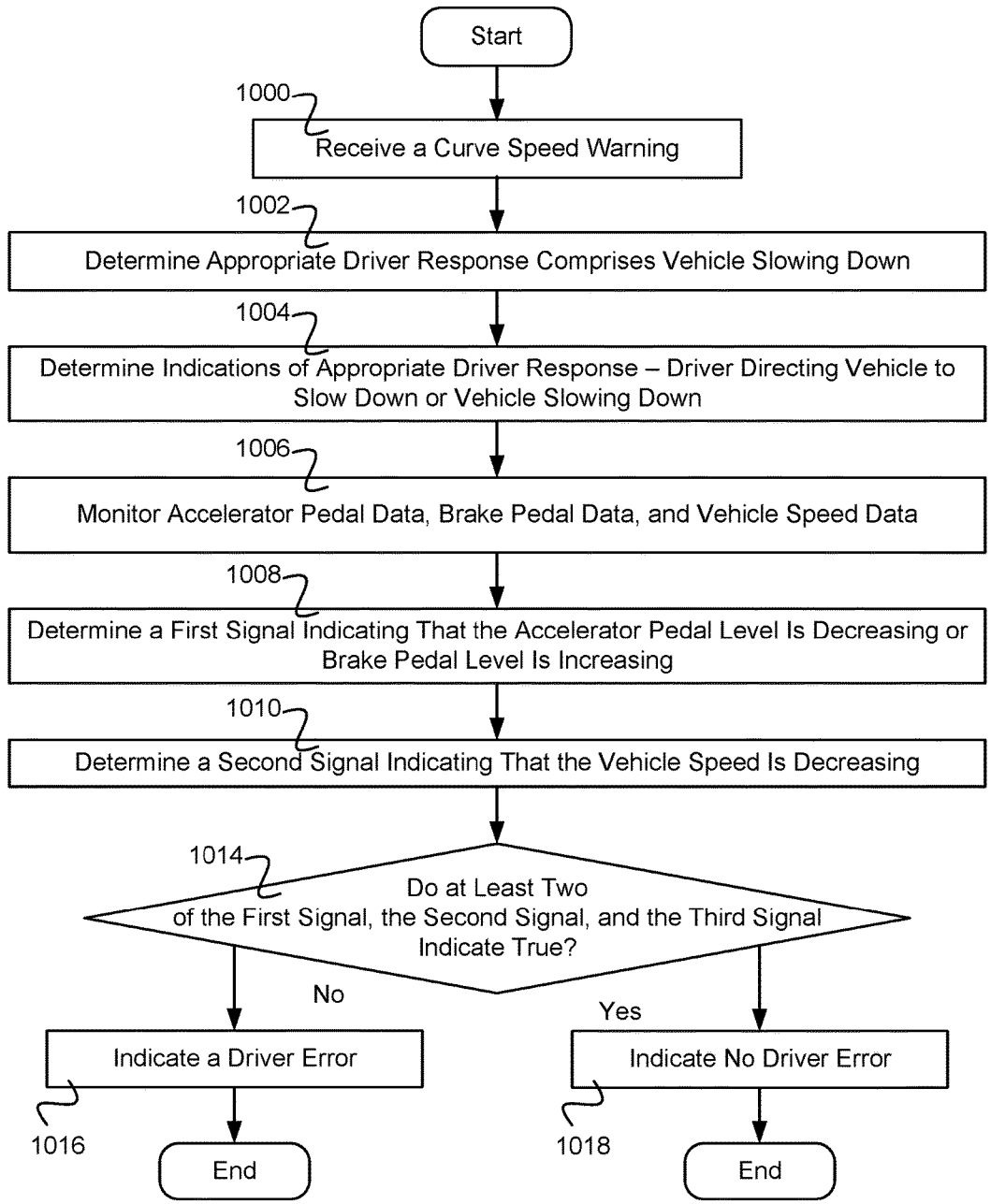
FIG. 10 is a flow diagram illustrating an embodiment of a process for determining a driver error in response to a curve speed warning.

FIG. 10 is a flow diagram illustrating an embodiment of a process for determining a driver error in response to a curve speed warning. In some embodiments, the process of FIG. 10 is performed by a system for determining driver errors (e.g., system for determining driver errors 300 of FIG. 3). In the example shown, in 1000, a curve speed warning is received. For example, the system receives a curve speed warning from a safety warning system via a network. In 1002, it is determined that an appropriate driver response to comprises the vehicle slowing down. In 1004, it is determined that indications of an appropriate driver response comprise the driver directing the vehicle to slow down or the vehicle slowing down. In 1006, accelerator pedal data, brake pedal data, and vehicle speed data are monitored. In 1008, a first signal indicating that the accelerator pedal level is decreasing or that the brake pedal level is increasing is determined (e.g., the first signal indicates true in the event that the accelerator pedal level is decreasing or the brake pedal level is increasing). In 1010, a second signal indicating that the vehicle speed is decreasing is determined. In some embodiments, determining the first signal and the second signal comprises determining a driver response. In 1014, it is determined whether the first signal and the second signal indicate true. In some embodiments, determining whether the first signal and the second signal indicate true comprises determining whether the driver response comprises the appropriate driver response. In the event it is determined that the first signal and the second signal indicate true, control passes to 1016. In 1016, a driver error is indicated, and the process ends. In the event it is determined in 1014 that the first signal and the second signal indicate true, control passes to 1018. In 1018, it is determined that there is no driver error, and the process ends.

Figure 11:
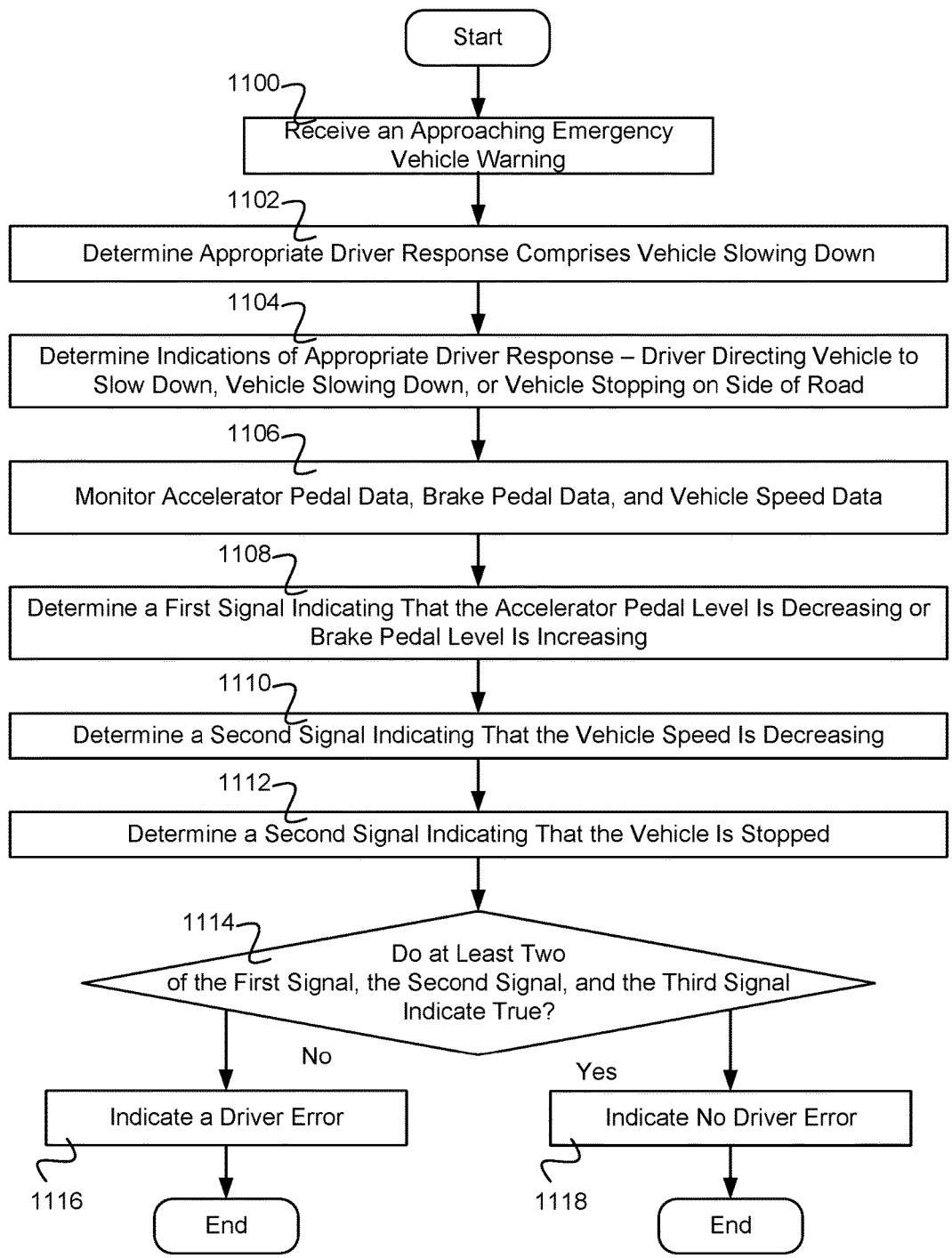
FIG. 11 is a flow diagram illustrating an embodiment of a process for determining a driver error in response to an approaching emergency vehicle warning.

FIG. 11 is a flow diagram illustrating an embodiment of a process for determining a driver error in response to an approaching emergency vehicle warning. In some embodiments, the process of FIG. 11 is performed by a system for determining driver errors (e.g., system for determining driver errors 300 of FIG. 3). In the example shown, in 1100, an approaching emergency vehicle warning is received. For example, the system receives an approaching emergency vehicle warning from a safety warning system via a network. In 1102, it is determined that an appropriate driver response to comprises vehicle slowing down. In 1104, it is determined that indications of an appropriate driver response comprise the driver directing the vehicle to slow down, the vehicle slowing down, or vehicle stopping on the side of the road. In 1106, accelerator pedal data, brake pedal data, and vehicle speed data are monitored. In 1108, a first signal indicating that the accelerator pedal level is decreasing or that the brake pedal level is increasing is determined (e.g., the first signal indicates true in the event that the accelerator pedal level is decreasing or the brake pedal level is increasing). In 1110, a second signal indicating that the vehicle speed is decreasing is determined. In 1112, a third signal indicating that the vehicle is stopped is determined. In some embodiments, determining the first signal, the second signal, and the third signal comprises determining a driver response. In 1114, it is determined whether at least two of the first signal, the second signal, and the third signal indicate true. In some embodiments, determining whether at least two of the first signal, the second signal, and the third signal indicate true comprises determining whether the driver response comprises the appropriate driver response. In the event it is determined that not at least two of the first signal, the second signal, and the third signal indicate true, control passes to 1116. In 1116, a driver error is indicated, and the process ends. In the event it is determined in 1114 that at least two of the first signal, the second signal, and the third signal indicate true, control passes to 1118. In 1118, it is determined that there is no driver error, and the process ends.

Figure 12:
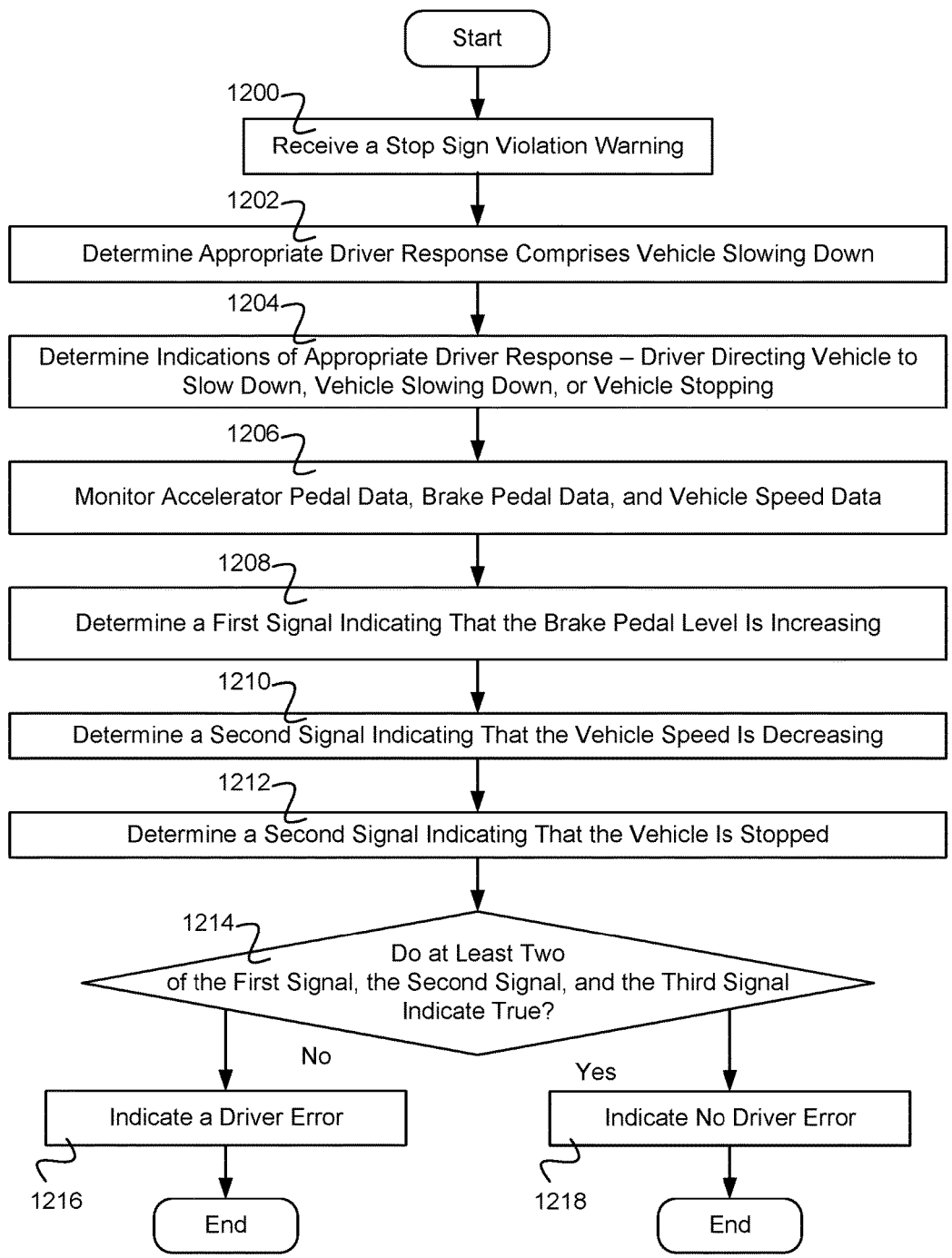
FIG. 12 is a flow diagram illustrating an embodiment of a process for determining a driver error in response to a stop sign violation warning.

FIG. 12 is a flow diagram illustrating an embodiment of a process for determining a driver error in response to a stop sign violation warning. In some embodiments, the process of FIG. 12 is performed by a system for determining driver errors (e.g., system for determining driver errors 300 of FIG. 3). In the example shown, in 1200, a stop sign violation warning is received. For example, the system receives a stop sign violation warning from a safety warning system via a network. In 1202, it is determined that an appropriate driver response to comprises vehicle slowing down. In 1204, it is determined that indications of an appropriate driver response comprise the driver directing the vehicle to slow down, the vehicle slowing down, or vehicle stopping. In 1206, accelerator pedal data, brake pedal data, and vehicle speed data are monitored. In 1208, a first signal indicating that the brake pedal level is increasing is determined (e.g., the first signal indicates true in the event that the brake pedal level is increasing). In 1210, a second signal indicating that the vehicle speed is decreasing is determined. In 1212, a third signal indicating that the vehicle is stopped is determined. In some embodiments, determining the first signal, the second signal, and the third signal comprises determining a driver response. In 1214, it is determined whether at least two of the first signal, the second signal, and the third signal indicate true. In some embodiments, determining whether at least two of the first signal, the second signal, and the third signal indicate true comprises determining whether the driver response comprises the appropriate driver response. In the event it is determined that not at least two of the first signal, the second signal, and the third signal indicate true, control passes to 1216. In 1216, a driver error is indicated, and the process ends. In the event it is determined in 1214 that at least two of the first signal, the second signal, and the third signal indicate true, control passes to 1218. In 1218, it is determined that there is no driver error, and the process ends.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for determining driver errors, comprising:
an interface configured to receive a safety warning from a safety warning system, wherein:
the safety warning system is configured to communicate via a vehicle to vehicle communications system, a vehicle to infrastructure communications system, and a vehicle to device communications system, and
the safety warning is received via a vehicle to vehicle communications system;
a processor configured to:
determine an appropriate driver response based at least in part on the safety warning;
determine a driver response;
determine whether the driver response comprises the appropriate driver response; and
in the event the driver response does not comprise the appropriate driver response, indicate a driver error including providing coaching information.

2. The system of claim 1, wherein the safety warning system comprises a vehicle to infrastructure communications system.

3. The system claim 1, wherein the safety warning system comprises a vehicle to device communications system.

4. The system of claim 1, wherein the appropriate driver response comprises slowing down.

5. The system of claim 1, wherein the appropriate driver response comprises pulling over.

6. The system claim 1, wherein the appropriate driver response comprises hard braking.

7. The system of claim 1, wherein the appropriate driver response comprises looking around.

8. The system of claim 1, wherein the appropriate driver response comprises turning on vehicle lights.

9. The system of claim 1, wherein the appropriate driver response comprises increasing following distance.

10. The system of claim 1, wherein the driver response is determined based at least in part on vehicle event recorder data.

11. The system of claim 1, wherein the driver response is determined based at least in part on sensor data.

12. The system of claim 1, wherein indicating a driver error comprises recording sensor data.

13. The system of claim 1, wherein indicating a driver error comprises recording video data.

14. The system of claim 1, wherein indicating a driver error comprises recording safety warning system data.

15. The system of claim 1, wherein indicating a driver error comprises providing an indication to the driver.

16. The system of claim 13, wherein the indication to the driver comprises a light indication.

17. The system of claim 13, wherein the indication to the driver comprises a sound indication.

18. The system of claim 13, wherein the indication to the driver comprises an audio instruction.

19. A method for determining driver errors, comprising:
- receiving a safety warning from a safety warning system, wherein the safety warning system is configured to communicate via a vehicle to vehicle communications system, a vehicle to infrastructure communications system, and a vehicle to device communications system, and the safety warning is received via a vehicle to vehicle communications system;
- determining, using a processor, an appropriate driver response based at least in part on the safety warning;
- determining a driver response;
- determining whether the driver response comprises the appropriate driver response; and
- in the event the driver response does not comprise the appropriate driver response, indicate a driver error including providing coaching information.

20. A computer program product for determining driver errors, the computer program product being embodied in a non-transitory computer readable storage medium and comprising computer instructions for:
- receiving a safety warning from a safety warning system, wherein the safety warning system is configured to communicate via a vehicle to vehicle communications system, a vehicle to infrastructure communications system, and a vehicle to device communications system, and the safety warning is received via a vehicle to vehicle communications system;
- determining an appropriate driver response based at least in part on the safety warning;
- determining a driver response;
- determining whether the driver response comprises the appropriate driver response; and
- in the event the driver response does not comprise the appropriate driver response, indicate a driver error including providing coaching information.

* * * * *